United States Patent
Wiener et al.

(10) Patent No.: US 11,240,271 B2
(45) Date of Patent: Feb. 1, 2022

(54) DISTRIBUTED DETECTION OF SECURITY THREATS IN A REMOTE NETWORK MANAGEMENT PLATFORM

(71) Applicant: ServiceNow, Inc., Santa Clara, CA (US)

(72) Inventors: David Joshua Wiener, Ramat Biet Shemesh (IL); Barak Pinchovski, Tel Aviv (IL); Nir Yariv, Kfar Sava (IL)

(73) Assignee: ServiceNow, Inc., Santa Clara, CA (US)

( * ) Notice: Subject to any disclaimer, the term of this patent is extended or adjusted under 35 U.S.C. 154(b) by 592 days.

(21) Appl. No.: 16/191,113

(22) Filed: Nov. 14, 2018

(65) Prior Publication Data

US 2020/0153863 A1 May 14, 2020

(51) Int. Cl.
*H04L 29/06* (2006.01)
*G06N 20/00* (2019.01)
*G06F 3/0482* (2013.01)

(52) U.S. Cl.
CPC .......... *H04L 63/20* (2013.01); *H04L 63/0421* (2013.01); *G06F 3/0482* (2013.01); *G06N 20/00* (2019.01)

(58) Field of Classification Search
CPC ... H04L 63/145; H04L 63/1416; H04L 63/30; H04L 63/0421; H04L 63/1441
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |

(Continued)

OTHER PUBLICATIONS

Trusted Security Circles, printed from https://docs.servicenow.com/bundle/kingston-security-management/page/product/trusted-circles/reference/trusted-circles-landing-page.html, Oct. 29, 2018.

*Primary Examiner* — Paul E Callahan
(74) *Attorney, Agent, or Firm* — Fletcher Yoder PC

(57) ABSTRACT

A system may include a plurality of computational instances dedicated to different managed networks and a central instance communicatively coupled to the plurality of computational instances. A first computing device disposed within a first computational instance may be configured to: obtain a profile of a software application operational within a first managed network to which the first computational instance is dedicated, calculate a threat level of the software application based on the profile, determine that the threat level exceeds a pre-determined threshold, and transmit, to the central instance, an indication that the threat level exceeds the pre-determined threshold. A second computing device disposed within the central instance may be configured to: receive the indication, determine that the software application is also operational within a second managed network to which a second computational instance, and transmit, to the second computational instance, an indication that the threat level exceeds the pre-determined threshold.

20 Claims, 12 Drawing Sheets

(56) References Cited

U.S. PATENT DOCUMENTS

| | | |
|---|---|---|
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2015/0073981 A1 | 3/2015 | Adjaoute |
| 2017/0251013 A1* | 8/2017 | Kirti .................. H04L 63/1441 |
| 2020/0320450 A1* | 10/2020 | Datta Ray ........... H04L 63/1433 |

* cited by examiner

FIG. 8A

DISTRIBUTED DETECTION OF SECURITY THREATS IN A REMOTE NETWORK MANAGEMENT PLATFORM

BACKGROUND

Computer security threats take a variety of forms, and the impact of each threat can be anywhere from negligible, to inconvenient, to catastrophic. Types of threats include spyware, denial of service (DOS) attacks, phishing attempts, Trojan horses, worms, and viruses, just to name a few. The software that perpetrates these threats is referred to generally as "malware."

Unless measures are taken to address security threats, malware can be used to obtain private, confidential, and/or personal information, inappropriately use computing resources, or to prevent or limit legitimate use of computing resources. Therefore, in addition to attempts to prevent the introduction of spyware to a system (e.g., through the use of firewalls, host-level security, and other security policies), it can be important to also periodically scan the system for known or suspected threats. Once a threat is identified, it can be further investigated, and then potentially disabled or eradicated.

SUMMARY

Given their large and expanding scales, enterprise networks are particularly vulnerable to security threats. With hundreds, thousands, or even hundreds of thousands of devices and applications to manage, mitigating security risks in just a single enterprise can be challenging.

Often, enterprises have multiple connection points to the Internet and/or other networks (e.g., gateways, virtual private networks) that need to be protected. Further, individual user devices, such as laptops, tablets, and smartphones, may be connected to and disconnected from the enterprise's network multiple times per day. While not on the enterprise's network, these devices may be on another network (e.g., a Wifi hotspot, a home network, or another enterprise's network) that has lesser or different security measures. Further, a naïve user may download or side-load (e.g., by way of a flash drive) malware into his or her device that is invisible to the untrained eye or disguised as legitimate software.

With these many vectors of attack, enterprise network administrators may apply best practices to secure access to their networks, to install anti-malware software and keep it up to date, and to educate users on how to avoid security risks. Nonetheless, malware can still find its way into an enterprise.

For example, zero-day threats are new or otherwise unknown threats that can be difficult to identify and address. Firewall rules and anti-malware software, even if up to date, might not be able to detect these threats. Therefore, a zero-day threat may be able to penetrate and spread throughout an enterprise for some period of time before it is detected and eradicated.

But even after a security threat is addressed, enterprise network administrators might not share this information with other enterprises. Thus, avoidable security threats may continue to plague these other enterprises while they are either oblivious to the threats or working on a solution to address the threats. Thus, in addition to threats not being addressed in a timely fashion, security efforts may be duplicated between enterprises when resolving threats.

The embodiments herein provide an automated, anonymized, and rapid way to share information regarding security threats between enterprises. Notably, enterprises that use computational instances within a remote network management platform may be particularly well-situated for such sharing. For example, the computational instance of one enterprise may determine that a security threat of at least a certain level or criticality exists in that enterprise's managed network. Information relevant to identify and/or address the security threat may be anonymized to remove or obscure information specific to this enterprise (e.g., device names and addresses, account names, usernames, etc.). Then, this information may be provided to another enterprise's computational instance. This other enterprise may use the information to detect and address the security threat on its own managed network. In this fashion, security threats that are common amongst enterprises can be rapidly identified and mitigated.

Accordingly, a first example embodiment may involve a remote network management platform. The remote network management platform may include a plurality of computational instances dedicated to different managed networks, where each of the plurality of computational instances contains one or more respective computing devices. The remote network management platform may also include a central instance communicatively coupled to the plurality of computational instances, where the central instance is not dedicated to any of the managed networks, and where the central instance contains one or more central computing devices. A first computing device disposed within a first computational instance of the plurality of computational instances may be configured to: obtain a profile of a software application operational within a first managed network to which the first computational instance is dedicated, calculate a threat level of the software application based on the profile, determine that the threat level of the software application exceeds a pre-determined threshold threat level, and transmit, to the central instance, an indication that the threat level of the software application exceeds the pre-determined threshold threat level. A second computing device disposed within the central instance is configured to: receive the indication that the threat level of the software application exceeds the pre-determined threshold threat level, determine that the software application is also operational within a second managed network to which a second computational instance of the plurality of computational instances is dedicated, and transmit, to the second computational instance, an indication that the threat level of the software application exceeds the pre-determined threshold threat level, where the first managed network and the second managed network are operated by different entities.

A second example embodiment may involve obtaining a profile of a software application operational within a first managed network to which a first computational instance of a remote network management platform is dedicated. The second example embodiment may also involve calculating a threat level of the software application based on the profile. The second example embodiment may also involve determining that the threat level of the software application exceeds a pre-determined threshold threat level. The second example embodiment may also involve determining that the software application is also operational within a second managed network to which a second computational instance of the remote network management platform is dedicated, where the first managed network and the second managed network are operated by different entities. The second example embodiment may also involve transmitting, to the second computational instance, an indication that the threat level of the software application exceeds the pre-determined threshold threat level.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts a graphical user interface indicating that an application classified as a threat is disposed on a number of computing devices, in accordance with example embodiments.

DETAILED DESCRIPTION

Figure 1:
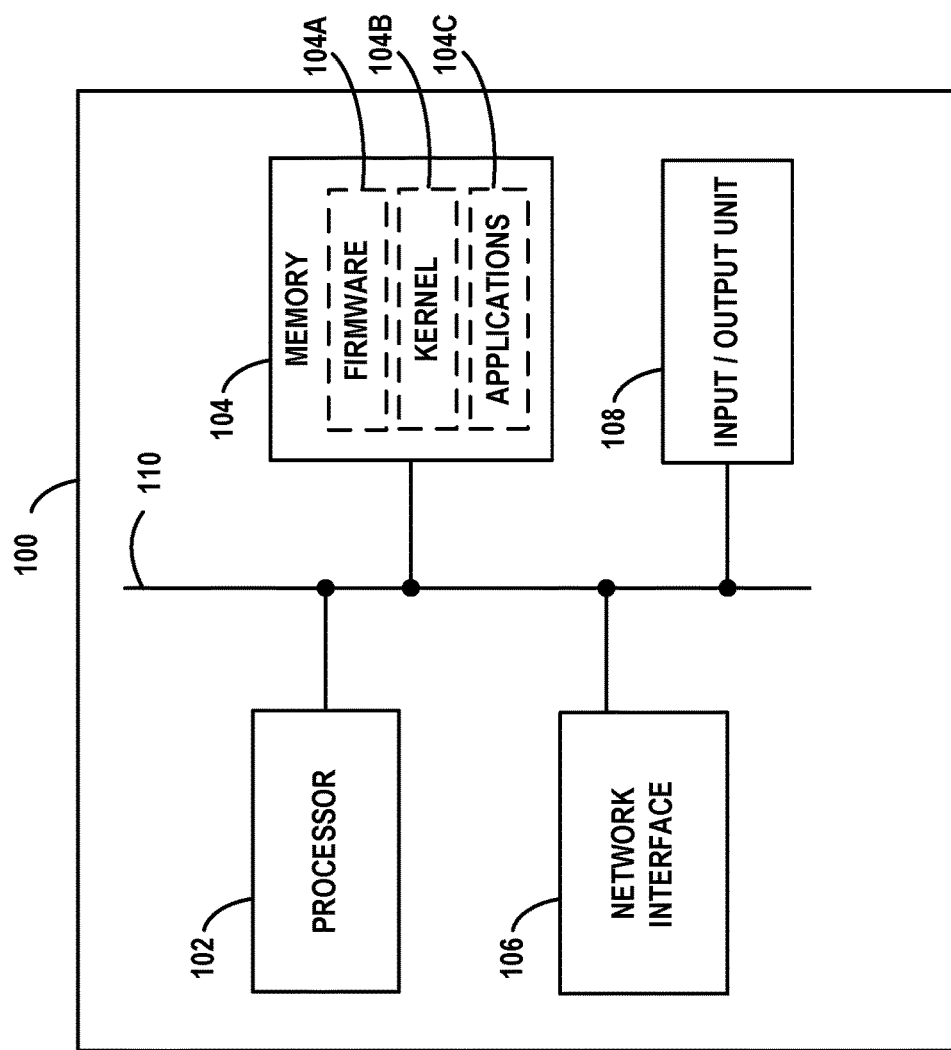
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
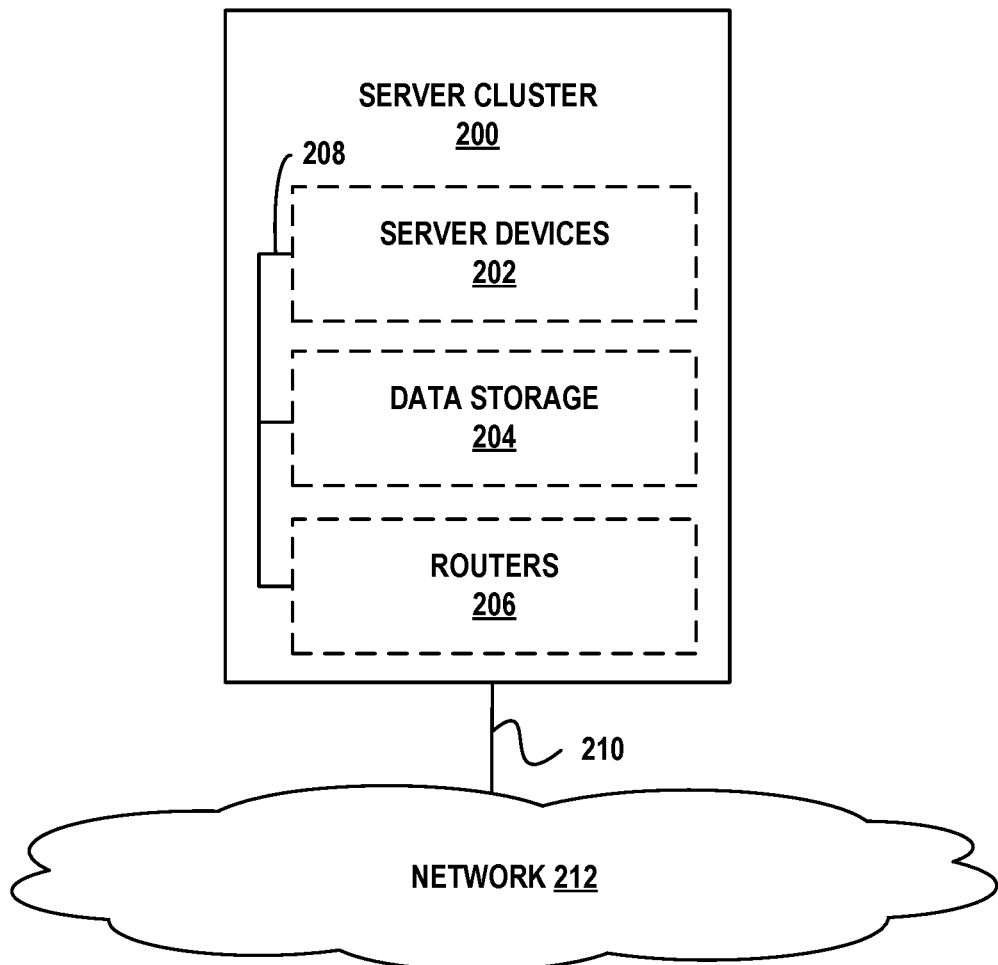
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
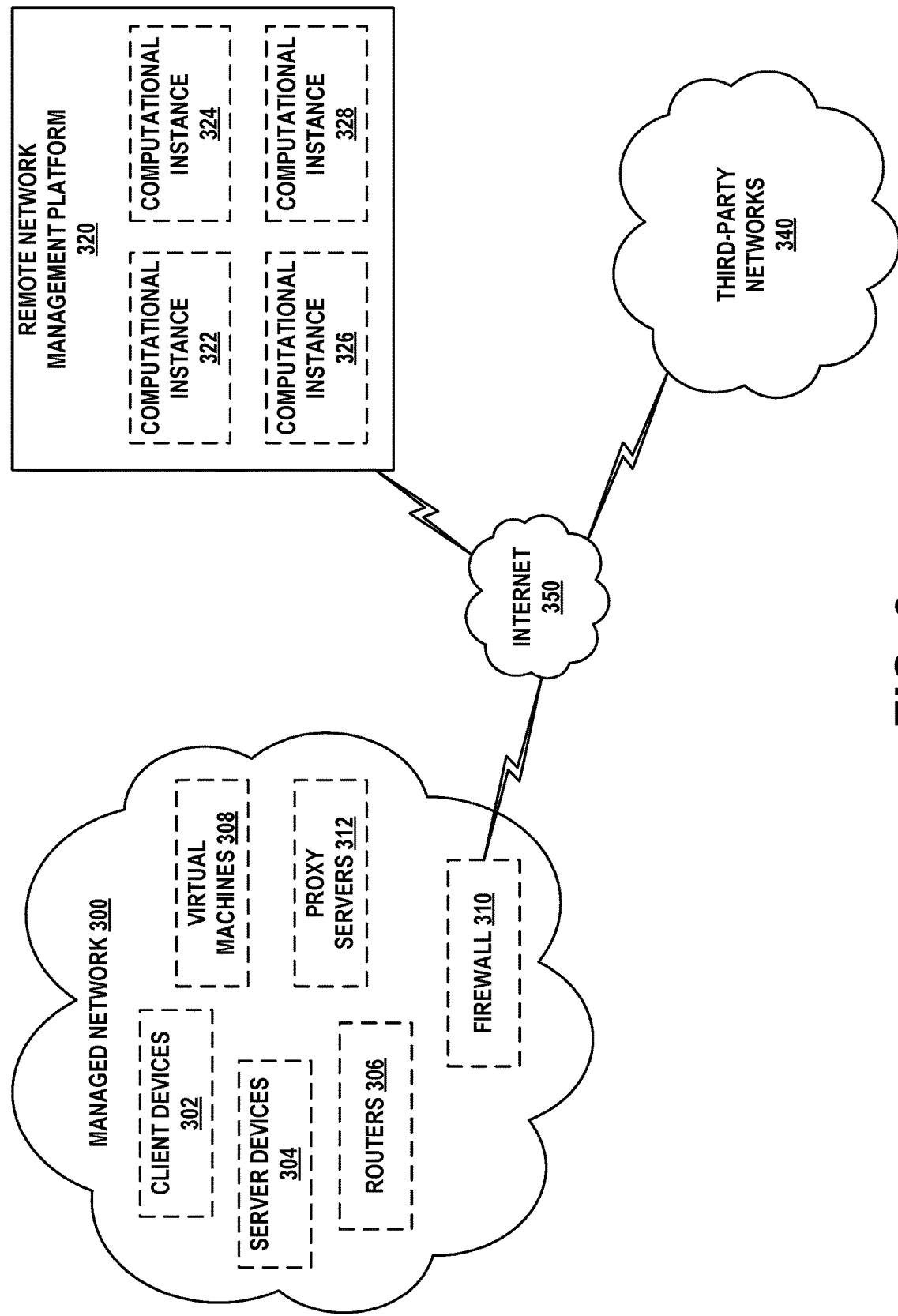
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
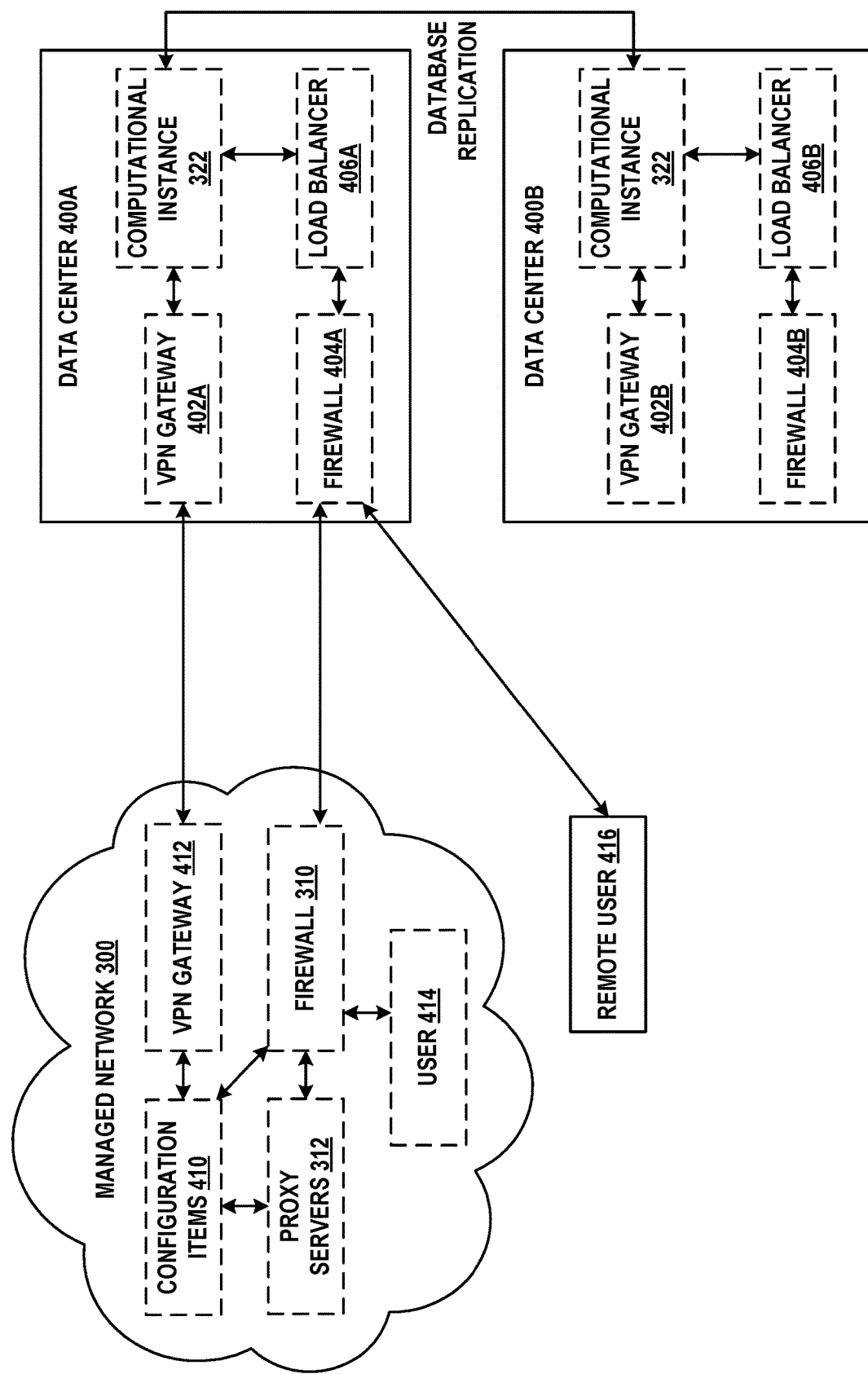
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
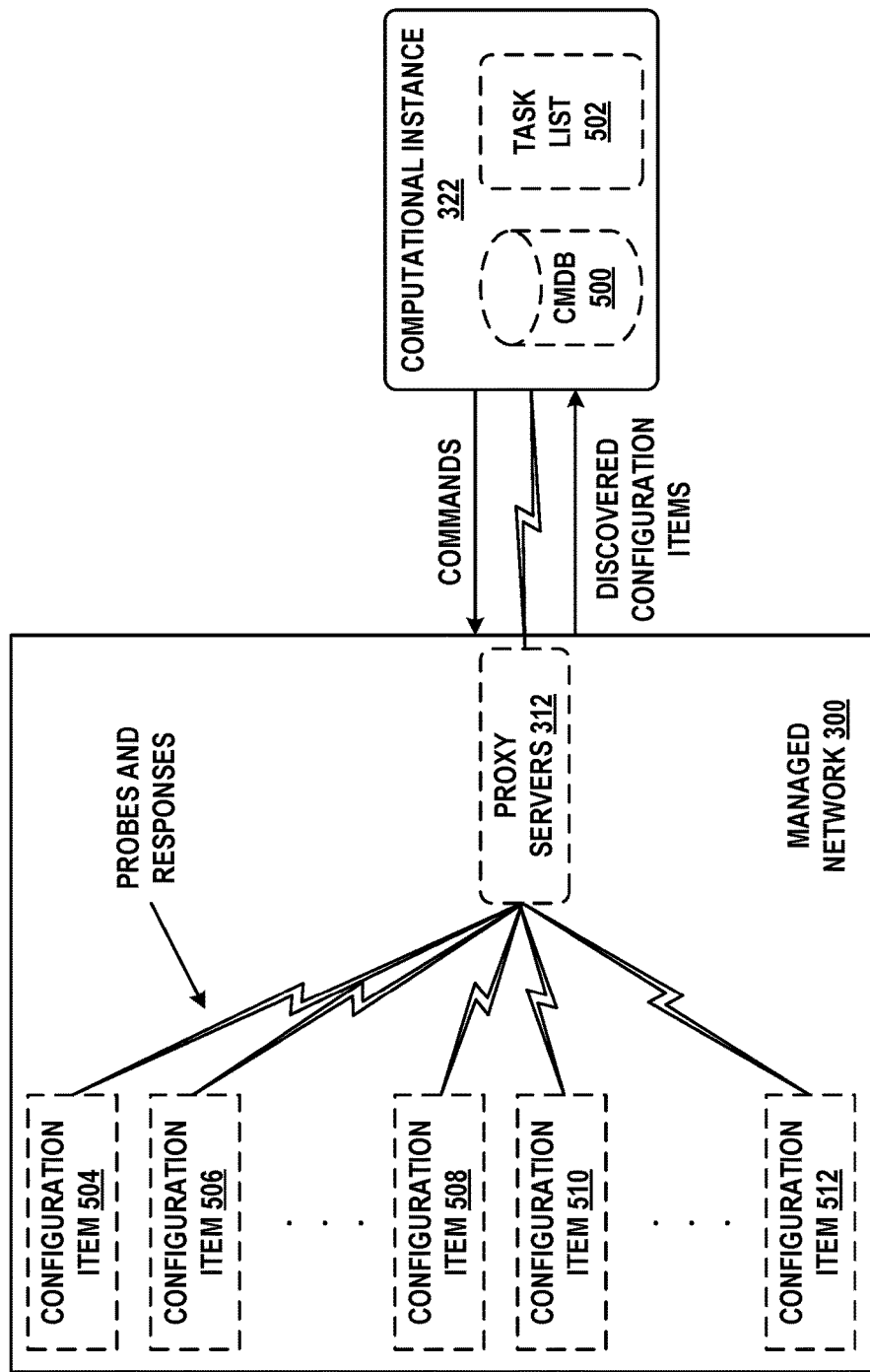
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
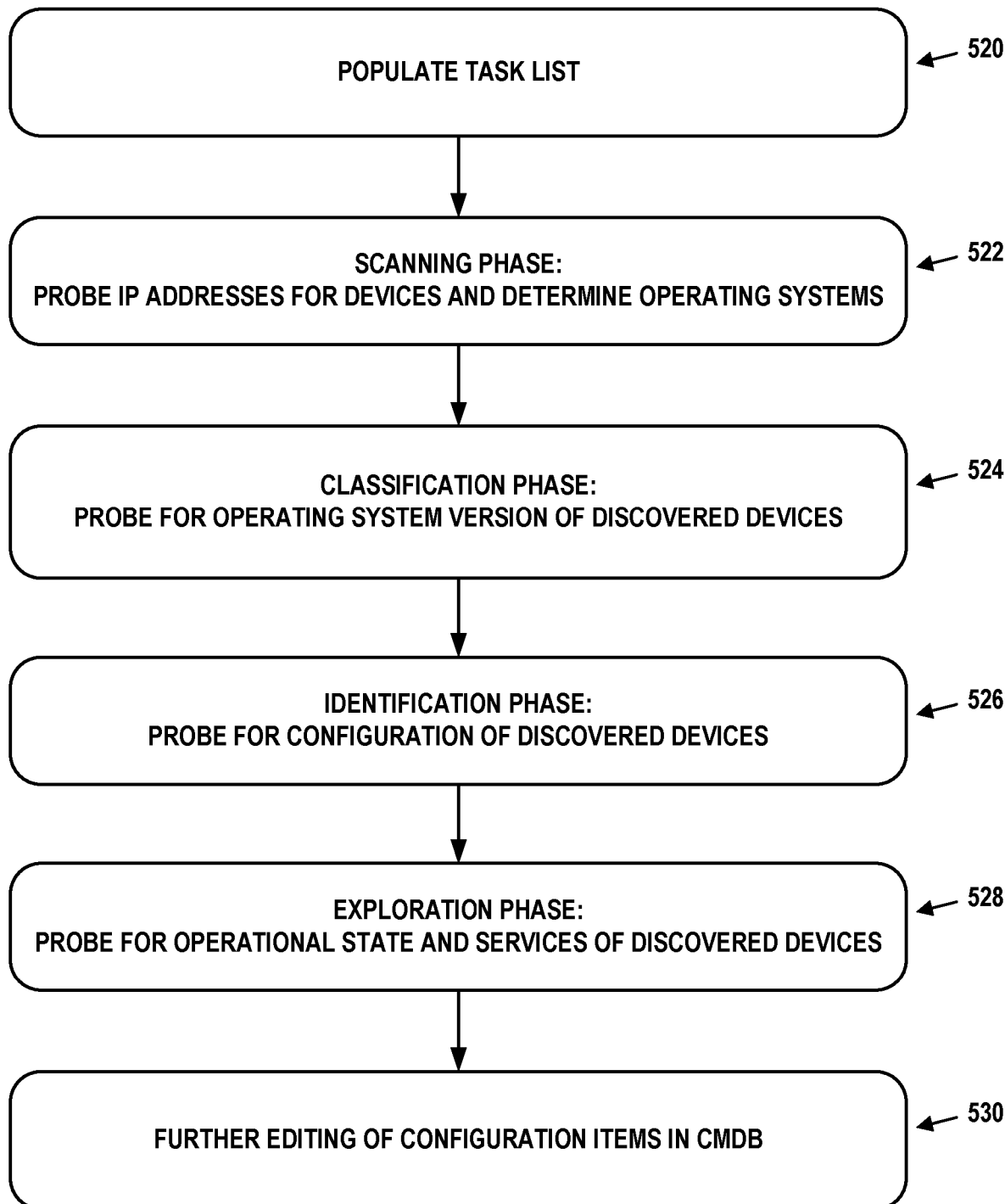
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Computer and Network Security Threats

Computer and network security threats take different forms, and the impact of each can vary dramatically. In this section, a number of threat categories are discussed. But this discussion is not comprehensive and additional threat categories may exist. Furthermore, some threats could be classified into multiple categories. Threats may generally be referred to as "malware."

A. Spyware

Spyware seeks to obtain information about the computing device that it is installed upon, including personal information (e.g., credit card numbers, bank account numbers, social security numbers, userids, and passwords) of users of the computing device, and/or confidential information (e.g., trade secrets, such as product designs, customer lists, financial data, etc.) related to an enterprise in which the computing device is deployed. Spyware may collect this information covertly, by operating in the "background" or with a small footprint. Information collected may be transmitted to a remote server.

Spyware includes keyloggers, which are applications that silently intercept and record keys activated or pressed on a keyboard or keypad of the computing device. Keyloggers can be particularly effective at obtaining passwords and other types of personal information.

B. Denial of Service

Denial of Service (DoS) attacks are designed to overwhelm a computing device or network in order to limit its capabilities or block legitimate activities from taking place. For example, distributed DoS attacks use a large number of compromised computing devices to transmit network traffic, overwhelming the target. Generally, DoS attacks tend to focus on a particular network or service and originate from outside the network being attacked. However, DoS attacks may also originate from inside such a network as well, causing network or device congestion.

C. Resource Hijacking

Resource hijacking malware seeks to use a computing device's processing power, memory, and/or available network capacity to perform some sort of action on an attacker's behalf. For example, one of the most prominent uses of resource hijacking is cryptocurrency mining. Cryptocurrency mining uses a computer's processing power to perform mathematical hash functions in order to create cryptocurrency. When using other people's computing resources without their knowledge, this may sometimes be referred to as "cryptojacking." Other examples of resource hijacking include a wide-variety of resource-heavy techniques, including file sharing (e.g., by way of a torrent), participating in DoS attacks, and/or simply creating port-forwarding scripts in order to anonymize internet activity.

D. Ransomware

Ransomware encrypts the data on a computing device in order to extort payments (e.g., large sums of money) from the victim in exchange for the decryption key. Alternatively, ransomware may attempt to capture personal and/or compromising behavior of an individual or group, and may threaten to publish this information if a payment is not provided.

E. Eavesdropping and Man-in-the-Middle Attacks

Eavesdropping may allow an external agent to track the activity of a network or computing device by logging the traffic coming from and entering such a network or computing device. Eavesdropping may be achieved in a more egregious sense by a man-in-the-middle (MITM) attack. An external party may achieve a MITM attack by inserting itself between two communicating devices and logging the data passed between the two devices. Furthermore, a MITM attack not only allows an attacker to track private activity, but it may allow the attacker to eliminate, inject, or alter the messages as the attacker sees fit.

F. Worms and Other Computer Viruses

Worms are applications that replicate themselves across computing devices and networks. When spread throughout a network, the worms can consume a large portion of the network's capacity, as well as the capacity of the computing devices infected with the worm. Worms often rely on unpatched security flaws in operating systems and applications in order to gain access to new devices. Worms may or may not cause additional harm aside from congestion.

Viruses are applications that can replicate themselves and perform various malicious acts either on their own or in conjunction with other applications. For instance, a virus may be a standalone program or a module of code that inserts itself into other applications. Viruses may act immediately or lie dormant for some period of time before activating. Some types of spyware, DoS attacks, resource hijacking attacks, ransomware, eavesdropping, or MITM attacks may spread by viruses.

G. Trojan Horses

A "Trojan horse" is an application or module of code that takes measures to hide its true intent. Thus, Trojan horses are often disguised as legitimate executable files. For instance, a Trojan horse may have the same file name and many of the functions of the legitimate file, but may have a different size, timestamp, checksum, and/or pattern of behavior. Sophisticated Trojan horses may attempt to insert themselves into and take over legitimate files without changing the size of the file or its "last modified" timestamp. Some types of spyware, DoS attacks, resource hijacking attacks, ransomware, eavesdropping, or MITM attacks may take the form of Trojan horses.

VI. Detection of Threats

In order to monitor and further address unauthorized access, misuse, or modification of a computer network and network-accessible resources, an enterprise may employ security procedures, monitor potential threats, delineate between legitimate network activity and potential security threats, and apply updates to the network accordingly.

Detecting security threats throughout a network may be based on information gathered by way of the discovery procedures described above. Discovery of these security threats (e.g., malicious files and their suspect activity) may involve accessing not only information related to the applications executing on the computing devices throughout the network, but the potentially malicious applications stored as files thereon but not executing at the time of discovery. For example, information gathered about applications during discovery or similar procedures may include a filename of the application, a size (e.g., file size in bytes) of the application, a last modified date (e.g., a timestamp of when the application was most recently modified) of the application and/or a checksum of the application (e.g., a one-way function run over all of the bytes in the application).

In some cases, a threat can be detected by the extent of computing resources that it uses on its host computing device. For example, a worm, an application conducting a DoS attack, or cryptojacking malware may use an unusually large amount of processing resources. A DoS attack may also use an unusually large amount of network capacity. Some cryptojacking attacks may use an unusually high amount of memory to store parts of a distributed ledger.

Thus, detection of security threats may include determining overall and/or per-application resource utilization on a computing device. Perhaps as part of discovery for that computing device, processor, memory, and/or network utilization attributable to various applications may be collected. To do so on UNIX® devices, a discovery application may remotely log on to a computing device and, from a command shell, execute one or more of the ps, top, netstat, or mpstat commands. Other commands may be used instead of or in addition to any of these commands. Similar commands or commands with similar functions may be used on WINDOWS® or other operating systems.

DoS attacks or other threats that transmit or receive a significant amount of network traffic may also be detected by a packet sniffer. A packet sniffer is an application that collects copies of some or all network traffic that reaches it by way of a network. When placed and configured appropriately, a packet sniffer can gather packets transmitted to or by one or more computing devices. Analyzing the collected traffic data may reveal an unusual amount of network traffic being generated by a particular computing device and/or application thereon. This abnormality may indicate that this computing device has been compromised by a security threat.

Threats can be detected by comparing this gathered information to one or more pre-determined values. For example, a given application with a particular file name may be expected to have a particular file size (e.g., 1,467,245 bytes), a particular last modified date (e.g., Jan. 27, 2018 at 13:34.58), and a particular checksum (e.g., bb8af0db in hexadecimal). Thus, if a file with the same file name is found during discovery but has a different file size, last modified date, and/or checksum, the newly-found file may be flagged as a potential threat. In some cases, a threat database may exist containing the file sizes, last modified dates, and/or checksums of files that are confirmed to be threats. If the newly-found file matches an entry in the threat database, the newly-found file may be flagged as a confirmed threat. In some cases, the database may contain application profiles with characteristics of "safe" files, and any application that deviates from such a profile may be flagged as potentially threatening.

Alternatively or additionally, threats can be detected by comparing the gathered information to one or more thresholds. For example, if the given application uses more than a threshold amount of a processor's capacity or a threshold amount of memory for more than a threshold number of consecutive minutes may be flagged as a potential threat. Or, if the given application is responsible for more than a threshold amount of network traffic within a threshold amount of time may also be flagged as a potential threat. In some embodiments, the destination endpoint of some of this traffic (e.g., the destination IP address of network traffic transmitted by the given application) may indicate that the given application is a potential threat.

In some embodiments, the extent of a potential threat's distribution within a managed network or across managed networks may be taken into account. For example, an application that exhibits suspicious characteristics and/or behavior (e.g., having an unexpected checksum or using an unusually high amount of processing power) might not be categorized as a threat based just on those factors. But if this application is found on more than a threshold number of computing devices in a managed network or more than a threshold percentage of computing devices in the managed network, it may be considered a threat. Similarly, if the suspect application is found on more than a threshold number of computing devices across multiple managed networks or in more than a threshold number of managed networks it may be considered a threat.

In other situations, the rate at which the suspect application is spreading throughout a managed network or between managed networks may also be taken into account. For example, suppose that discovery procedures determine that suspicious application has penetrated 2% of the computing devices in a managed network at 1 pm, but when discovery takes place again at 5 pm, penetration is up to 9%. This may be an indication that the suspicious application is a virus or worm, and that it should be considered a threat. In general, if an application spreads at a rate of more than n devices per hour or n % of all devices on the managed network per hour, this may trigger the application to be classified as a threat.

In some embodiments, machine learning (ML) may be used to classify whether applications are threats. Labeled data may be used to train an ML model. The outcome of the training may be an ML classifier that can be used to classify applications as either a threat or not a threat. Thus, the ML classifier may take in representations of application characteristics and provide Boolean output. In some cases, however, the ML classifier may provide other types of output, such as a predicted threat level (e.g., a percentage or a number between 1 and 4 inclusive that indicates the severity of the threat). Many various types of ML classifiers may be used to make these predictions. Some examples include Bayesian classifiers, support vector machines, linear classifiers, k-nearest-neighbor classifiers, decision trees, random forests, and neural networks.

As an example, Table 1 provides labeled training data that can be used to train an ML classifier. There are only five entries in Table 1 for purposes of simplicity. In most practical situations, hundreds or thousands of entries (or more) may be used to train the ML classifier.

Table 1 contains four inputs related to an application (file name, file size, last modified time, and checksum) in respective columns and one labeled output (whether the application is a threat) in a fifth column. It is assumed that the inputs are based on observations of actual applications on a computing device or network, and the associated outputs are based on manual classification (labeling) of these applications. Thus, for purposes of training the ML classifier, the labeled outputs may be considered ground truth values.

TABLE 1

| | Input | | | Output |
|---|---|---|---|---|
| File name | File size (bytes) | Last Modified Time | Checksum | Threat? |
| File_123.exe | 8,540,224 | 2018 Feb. 17.13:34.58 | 3bb43800 | No |
| File_234.exe | 656,822 | 2017 Dec. 1.23:16.33 | 32fef348 | Yes |
| File_123.exe | 8,540,224 | 2018 Feb. 17.13:34.58 | f916bb50 | Yes |
| File_345.exe | 54,756 | 2012 Jun. 29.05:11.27 | 1048d747 | Yes |
| File_456.exe | 10,232,225 | 2018 Sep. 27.22:53.44 | 5382beff | No |

As an example, the first entry indicates that an application with the file name "File_123.exe" a size of 8,540,224 bytes, a last modified time of 2018-02-17.13:34.58, and a checksum of 3bb43800 is not a threat. But, the third entry indicates that another application with the same file name, same size, same last modified time, and a different checksum is a threat. Thus, the application specified by the third entry may be the application of the first entry as modified by malware.

Only four inputs are represented in Table 1 for purposes of simplicity. In various embodiments, any of one or more of the additional application characteristics discussed above (e.g., processor utilization, memory utilization, associated network traffic, extent and rate of application distribution, etc.) may be used as inputs. Furthermore, the labeled output may include more than one output value and/or take the form of a range of values.

Figure 6:
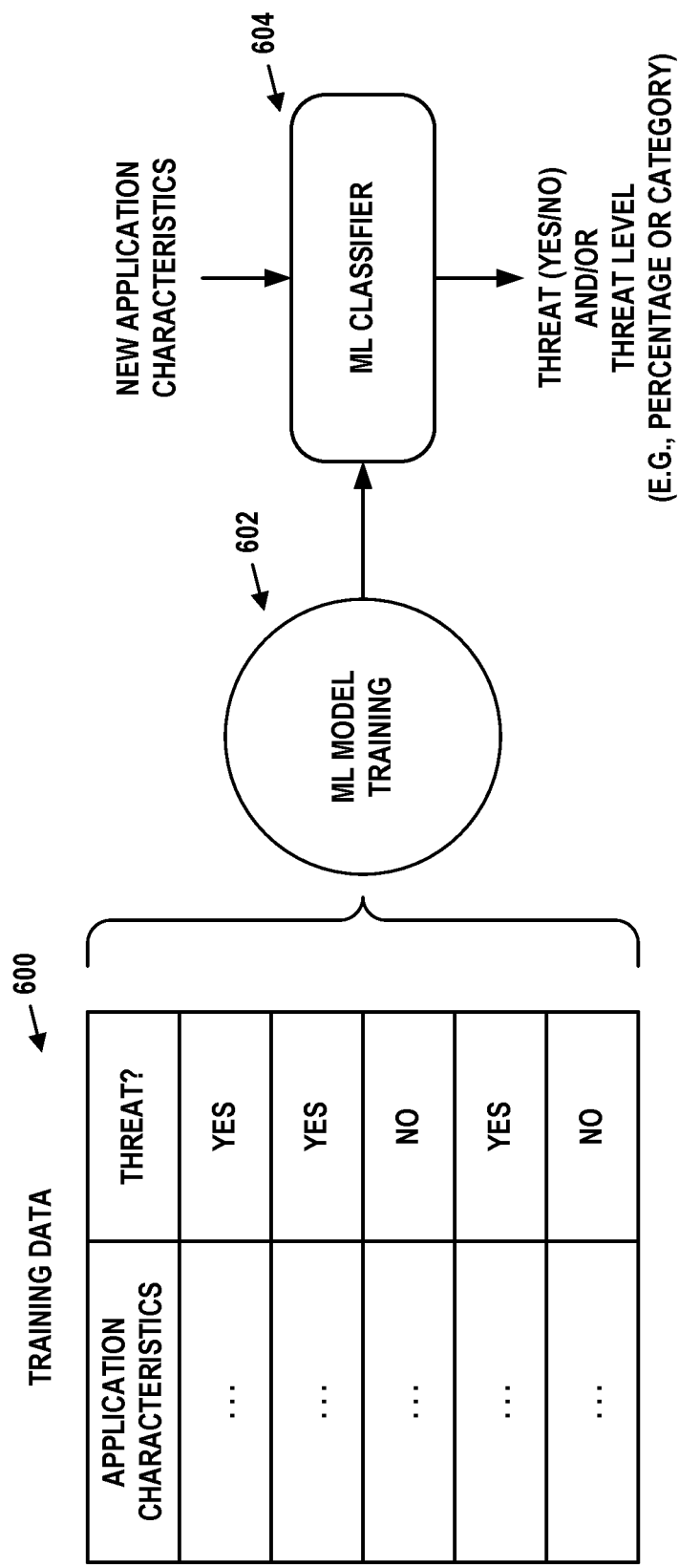
FIG. 6 depicts training and using a machine learning classifier to predict security threats to a computer and/or network, in accordance with example embodiments.

FIG. 6 depicts the training and use of an ML classifier. Training data 600 represents any data used to train the ML classifier, and may take a similar form as that of the example training data in Table 1. To that point, training data 600 maps characteristics of an application to whether that application is a threat.

ML model training 602 is a procedure that takes training data 600 and produces ML classifier 604. As noted above, ML classifier 604 may be any type of classifier, such as a Bayesian classifier, support vector machine, linear classifier, k-nearest-neighbor classifier, decision tree, random forest, or neural network.

Once ML classifier 604 is trained, it can be used to classify a new observation (e.g., a new set of application characteristics of a particular application) as either a threat or not a threat. As noted in FIG. 6, ML classifier 604 may alternatively produce a threat level (e.g., in the form of a percentage from 0% to 100% or a number of discrete categories). The classification produced by ML classifier 604 may be used as a prediction of the risk of allowing the application represented by the new observation to remain on a device or in a network.

Based on these predictions, the appropriate personnel may decide to allow the application to remain unmodified, investigate the application further, flag the application as a threat, remotely access the computing devices on which the application is found and stop it from executing further, remotely access the computing devices on which the application is found and delete it and its supporting files, or take other actions.

Also, upon further manual review, applications classified as threats may be determined to be false positives and/or applications classified as not being threats may be determined to be false negatives. This information may be used to update the threat classification of such applications, and incorporated into the training data used to train ML classifier 604 in the future.

In particular, a false negative may be a new zero-day threat that ML classifier 604 has not been trained to recognize as such. Accordingly, it is beneficial to be able to distribute information regarding these potential zero-day threats to computational instances of other managed networks.

VII. Distributing Threat Information Between Computational Instances

Regardless of how threats are detected in a managed network, the architecture provided by remote network management platform 320 is well situated to allow managed networks to proactively and anonymously notify other managed networks of threats, and possibly determine the extent and rate of a threat's spreading. In particular, computational instances disposed within remote network management platform 320 may be respectively dedicated to various managed networks. As these managed networks detect threats, information regarding the detected threats may be anonymized and shared with a central instance of remote network management platform 320. This central instance may then provide at least some of this threat information to other managed networks by way of their respective computational instances.

In this fashion, information about a new (e.g., zero-day) threat detected by one managed network can be rapidly provided to other managed networks using the remote network management platform 320. As a consequence, the spreading of the new threat may be slowed, mitigated, and/or prevented.

Figure 7:
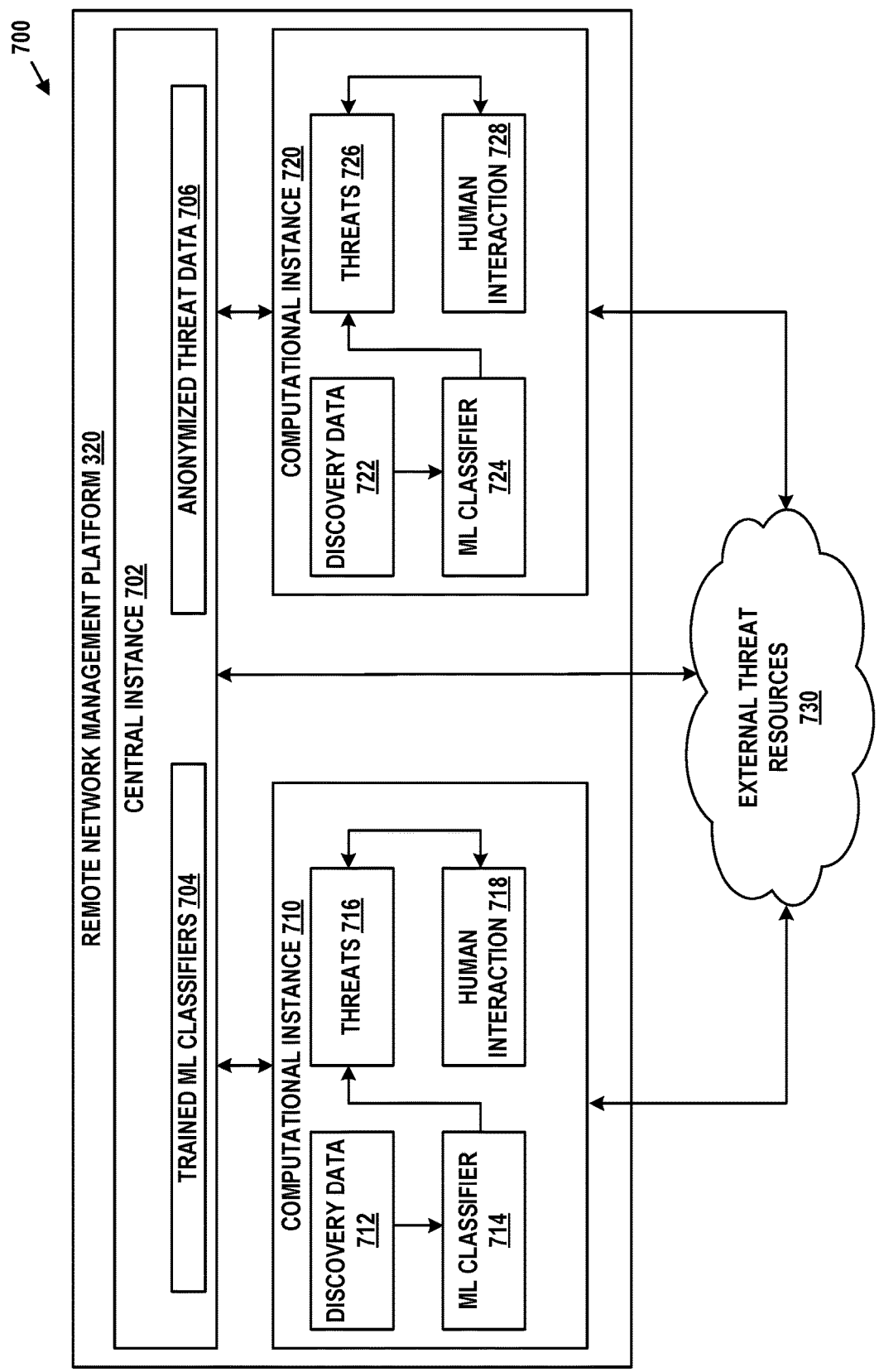
FIG. 7 depicts an architecture for anonymously distributing information regarding security threats, in accordance with example embodiments.

FIG. 7 depicts an architecture 700 including remote network management platform 320 and external threat resources 730. As noted in the context of FIG. 3, remote network management platform 320 may include central instance 702, computational instance 710, and computational instance 720. Other computational instances may also be disposed within remote network management platform 320.

External threat resources 730 may be one or more third-party databases, accessible by way of the Internet or other networks, containing characteristics of applications and indications of the respective threat levels of these applications. In some embodiments, the information available by way of external threat resources 730 may be similar to that of Table 1, and could potentially be used to train ML classifier 604.

Central instance 702 may contain trained ML classifiers 704 and anonymized threat data 706. Trained ML classifiers 704 may include ML classifier 604, for example, as well as other ML classifiers. In some cases, more than one ML classifier may be used for threat detection. Central instance 702 may distribute one or more of trained ML classifiers 704 to computational instance 710 and/or computational instance 720 upon request or automatically from time to time.

Anonymized threat data 706 may include representations of threats or suspected threats found on the managed networks associated with computational instance 710 and/or computational instance 720. This anonymization may involve removing any information that identifies the computational instance, managed network, computing device, or users with which the threat was identified. For example, host names, IP addresses, file names, user names, and so on may be scrambled or randomized.

Computational instance 710 may obtain discovery data 712 by way of the discovery procedures described in the context of FIGS. 5A and 5B. Discovery data 712 may include characteristics of applications (e.g., file name, file size, last modified time, checksum, processor utilization, memory utilization, network traffic utilization, extent and rate of spread) that can be used as input to ML classifier 714.

ML classifier 714 may take these inputs and predict whether the associated application is or is not a threat, and/or a threat level for the application. ML classifier 714 may be one of trained ML classifiers 704, and thus similar to ML classifier 604.

As output, ML classifier 714 may produce threats 716. Threats 716 may be a listing or other representation of information about applications that were predicted to be threats by ML classifier 714. Thus, threats 716 may include a file name, file size, and/or checksum of these applications, for example. Threats 716 may also include a list of computing devices that the applications are found on, as well as a description of the threat and possibly how it can be managed or eradicated. For example, information from external threat resources 730 may be consulted or used to provide additional insight into the nature of the threat.

Human interaction 718 represents procedures that may take place in order to further process, classify, and/or address threats 716. For example, a human may examine such a threat, determine its extent within the managed network associated with computational instance 710, and/or determine more information about the threat from external threat resources 730. Then, the human may re-classify the threat, perhaps adjusting the threat level to be higher (more of a risk) or lower (less of a risk).

Computational instance 720, discovery data 722, ML classifier 724, threats 726, and human interaction 728 may be analogous to those of computational instance 710. Thus, computational instance 720 may detect and classify threats in a similar fashion as, but independently from, from computational instance 710.

As an example of how information regarding threats can be shared between managed networks, suppose that computational instance 710 determines, by way of ML classifier 714, that a particular application disposed on 100 computing devices in its associated managed network is a moderate-level threat. Upon further review, perhaps involving human interaction 718, it is determined that this threat has been spreading at a rate of 10 computing devices per hour. As a result, the threat level for the application may be increased from moderate to severe.

Suppose further that the managed networks associated with computational instance 710 and computational instance 720 have both opted-in to anonymized security threat sharing. Therefore, computational instance 710 may anonymize the determined threat data and provide it to central instance 702. Central instance 702 may store this data with anonymized threat data 706, and provide a copy thereof to computational instance 720.

Upon or after receiving information from anonymized threat data 706, computational instance 720 may scan its discovery database (e.g., a CMDB) for the newly-identified threat. Alternatively, or additionally, computational instance 720 may re-run discovery on its managed network. Regardless, suppose that computational instance 720 determines that the particular application is disposed on 3 computing devices in its associated managed network. With this knowledge (and perhaps consulting external threat resources along the way), computational instance 720 may be able to address the threat before it spreads any further. For example, computational instance 720 may remotely access the 3 computing devices with the particular application and either stop the particular application from executing or delete the particular application and/or its supporting files (e.g., configuration and other data files).

Thus, the remote network management architecture herein allows interested managed networks to opt-in to safely sharing threat data with other managed networks. In return, the managed networks have access to up-to-date information on threats that other managed networks are experiencing or have resolved. In this way, threats can be more quickly detected and address using a form of crowd-sourcing.

Furthermore, any of the functionality described in the context of FIG. 7 can be distributed between computational instances and the central instance in various ways. In some embodiments, discovery data may be provided to the central instance, and the central instance may carry out the classification and threat analysis, automatically providing appropriate anonymized threat information to computational instances. In other embodiments, computational instances may share anonymized threat information with one another directly and/or on a bilateral basis.

VIII. Graphical User Interfaces

Security threat detection and analysis can be a complex and error-prone task for many users. The embodiments herein also address these challenges by way of graphical user interfaces (GUIs) that provide a representation of the state of computing devices and the applications disposed thereon. As a result of these embodiments, the potential security threats discovered across a network may be presented to a user in an easy-to-understand fashion. As such, a user may respond more quickly to a potential threat identified by the system. Two display views are illustrated herein—a dashboard list (described in the context of FIG. 8A) and a honeycomb heat map (described in the context of FIGS. 8B and 8C). These embodiments are intended to be used as examples only and do not encompass all possible GUIs. Various other embodiments may exist.

Figure 8A:
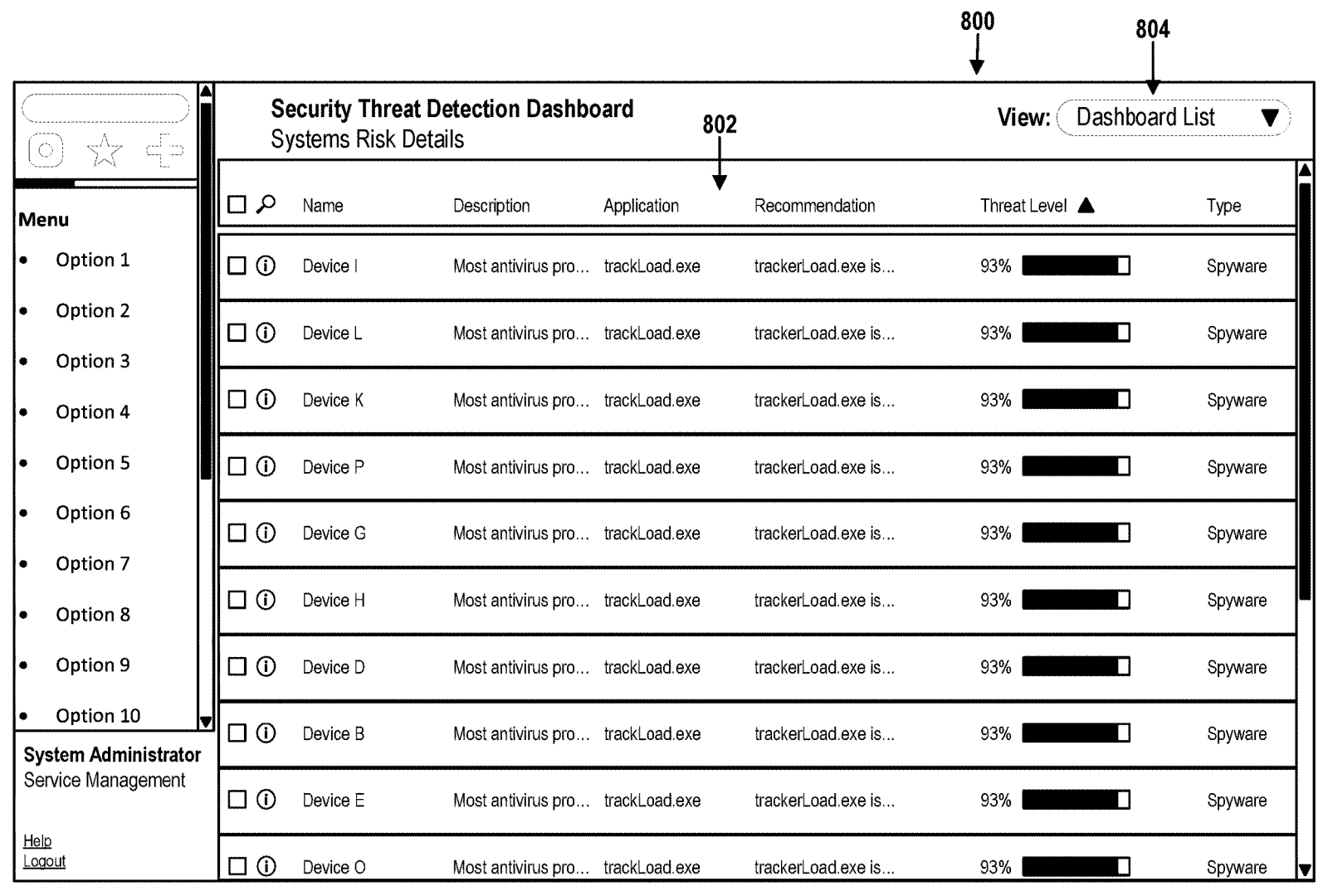

GUI 800 of FIG. 8A provides a dashboard list 802 of threats per computing device. Each row in dashboard list 802 represents an application disposed on a particular computing device. For example, all rows of dashboard list 802 are related to the application "trackLoad.exe", which is classified as spyware with a threat level of 93%. Dashboard list 800 also includes a short description of the application and a recommendation for addressing any issues related to the application. View selector 804 may be a drop-down menu that allows the user to select dashboard list 802 or another type of view.

Figure 8B:
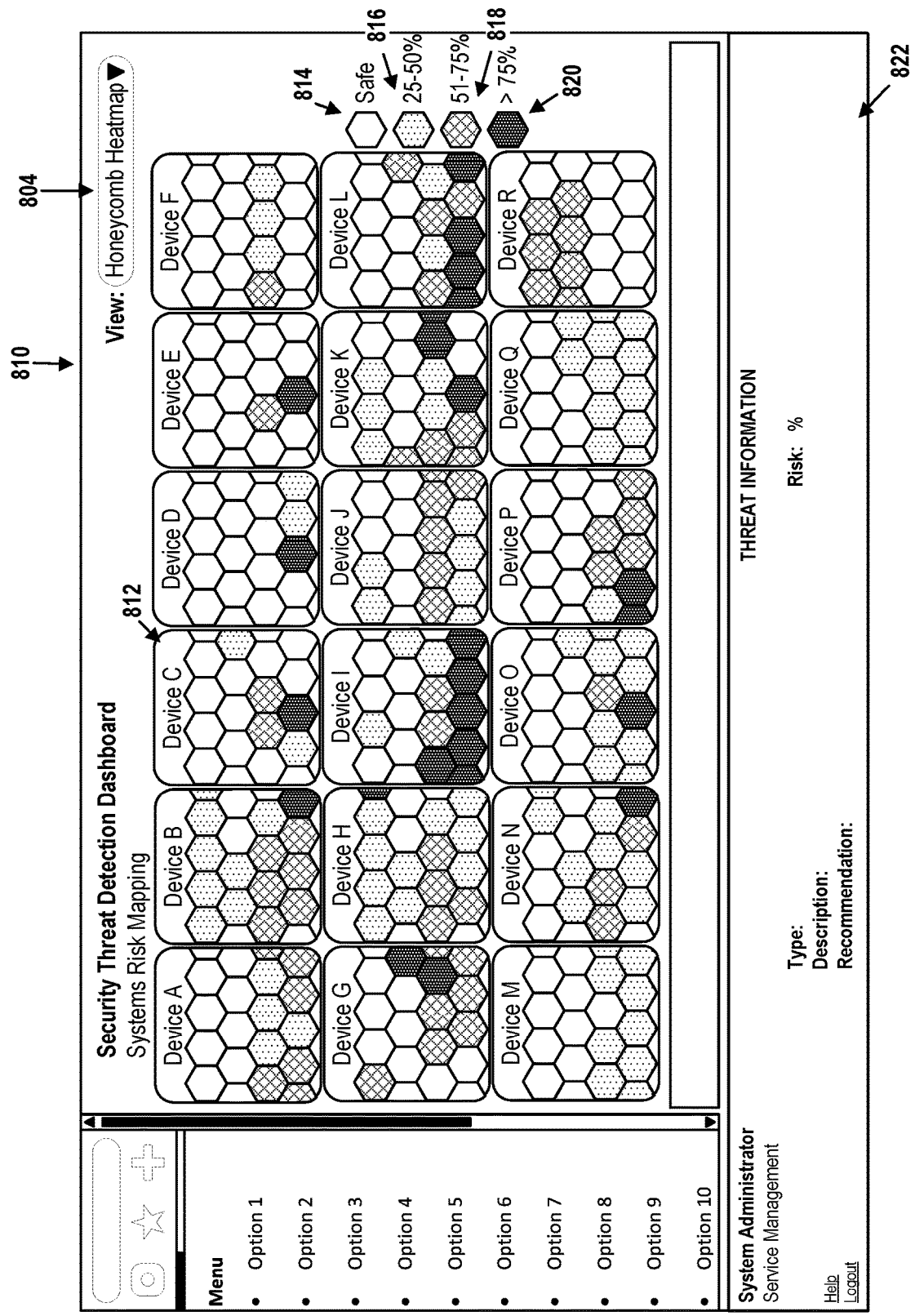
FIG. 8B depicts a graphical user interface of a heat map showing threat levels of applications disposed on various computing devices, in accordance with example embodiments.
Figure 8C:
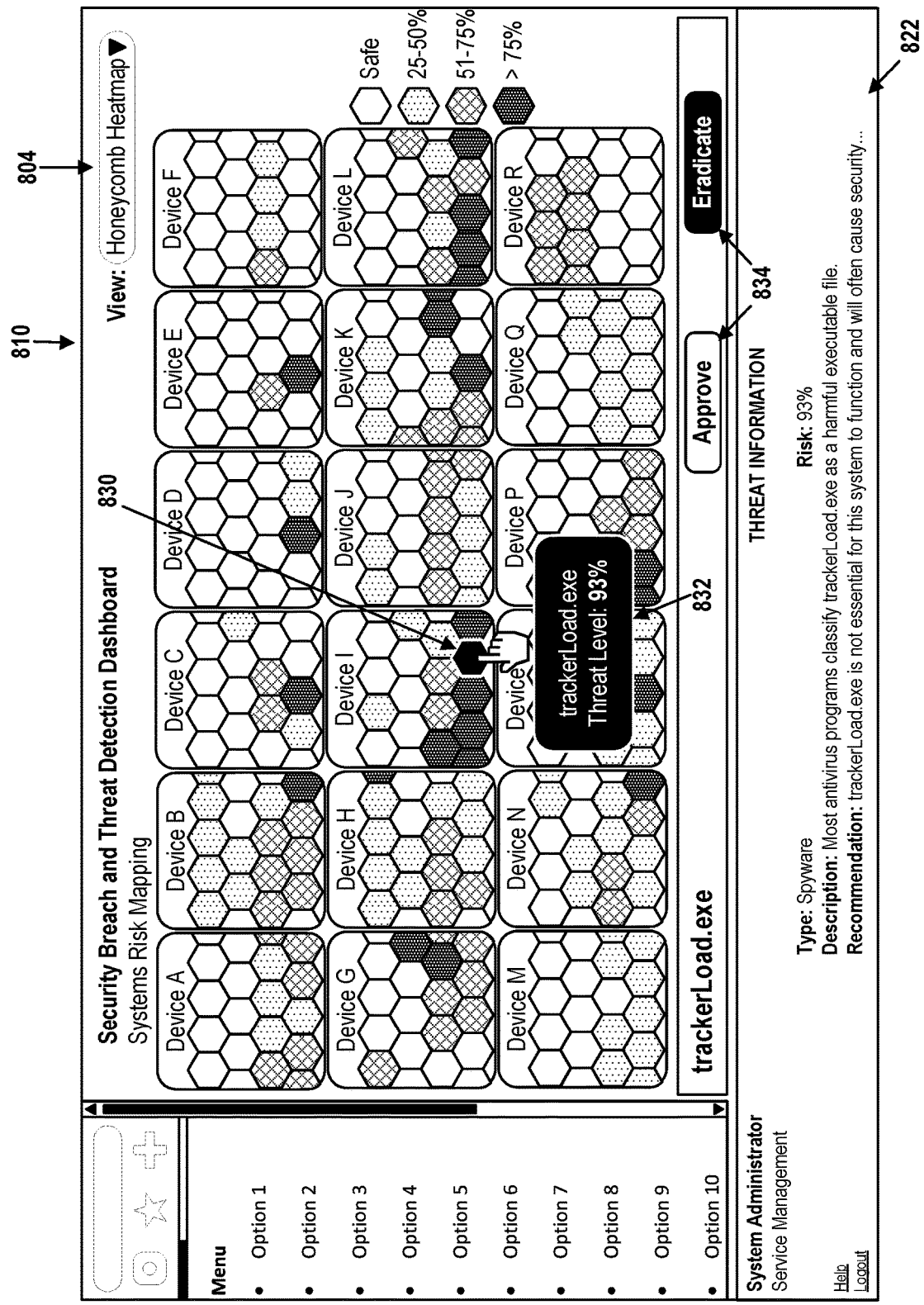
FIG. 8C depicts the heat map of FIG. 8B with further detail regarding the potential threat of a selected application, in accordance with example embodiments.

To that point, FIGS. 8B and 8C depict a GUI 810 that displays a honeycomb heat map of computing devices. These devices may all be within a managed network if GUI 810 is accessed from a particular computational instance, or may be across managed networks if GUI 810 is accessed from a central instance.

As an example, the representation of computing device 812 (entitled "Device C") contains a honeycomb representation of the various applications disposed thereon. The threat level for each of these applications, as determined by an ML classifier and possibly further modified by a human, may be used to decide the color or pattern displayed in the respective application's honeycomb.

In some embodiments, GUI 810 may display at least two distinct threat level categories. As an example, GUI 810 displays four threat levels: threat level range 814 ("<25%" or "Safe"), threat level range 816 ("25-50%"), threat level range 818 ("50-75%"), and threat level range 820 (">75%"). These threat levels may be produced by an ML classifier, such as ML classifier 604, that is given characteristics of applications as input. Each of the different threat levels may be designated in some fashion to visually differentiate from one another. For example, honeycombs with threat level range 814 may be colored green, those with threat level range 816 may be colored yellow, those with threat level range 818 may be colored orange, and those with threat level range 820 may be colored red. Differentiating applications based on threat level allows a user to quickly identify the applications that have the most severe threat levels and, as a result, may require immediate attention.

Each of the honeycombs on GUI 810 may be selectable, and information about an application related to a selected honeycomb may be displayed in threat information panel 822. FIG. 8C depicts GUI 810 with honeycomb 830 selected. Honeycomb 830 represents an application disposed on device I and marked with threat level range 820.

As a result of a honeycomb being selected, GUI 810 may display preview panel 832. Preview panel 832 may include information relevant to the application associated with honeycomb 830. For example, preview panel 832 displays the application name (e.g., "trackerLoad.exe") and the threat level indicated by a percentage (e.g., "Risk: 93%"). Preview panel 832 may also be displayed if a user hovers a pointing mechanism (e.g., a mouse pointer) over a honeycomb.

Possibly separate from preview panel 832, when a user selects a honeycomb, information panel 822 may be populated with information about the application associated with the honeycomb. In FIG. 8C, information panel 822 may contain information about the application, such as the application name (e.g., "trackerLoad.exe"), classified malware type (e.g., "Type: Spyware"), description (e.g., "Description: Most antivirus programs . . . "), recommendation (e.g., "Recommendation: trackerLoad.exe is not essential . . . "), threat level (e.g., "Risk: 93%"), and/or action buttons 834 (e.g., "Approved" and "Eradicate").

Action buttons 834 may include at least one button indicative of an action that may be related to the application. For example, preview panel 832, action buttons 834 contain two actions (e.g., "Approve" and "Eradicate"). When activated, the "Approve" action button cause to be stored, in a database associated with the managed network (e.g., a CMDB), an indication that the risk associated with the application is accepted. On the other hand, activation of the "Eradicate" button may invoke a remote access session (e.g., a command shell) to device I, and either stop execution of the application, or delete the application and its supporting files. In some embodiments, other action buttons associated with other actions may be displayed.

IX. Example Operations

Figure 9:
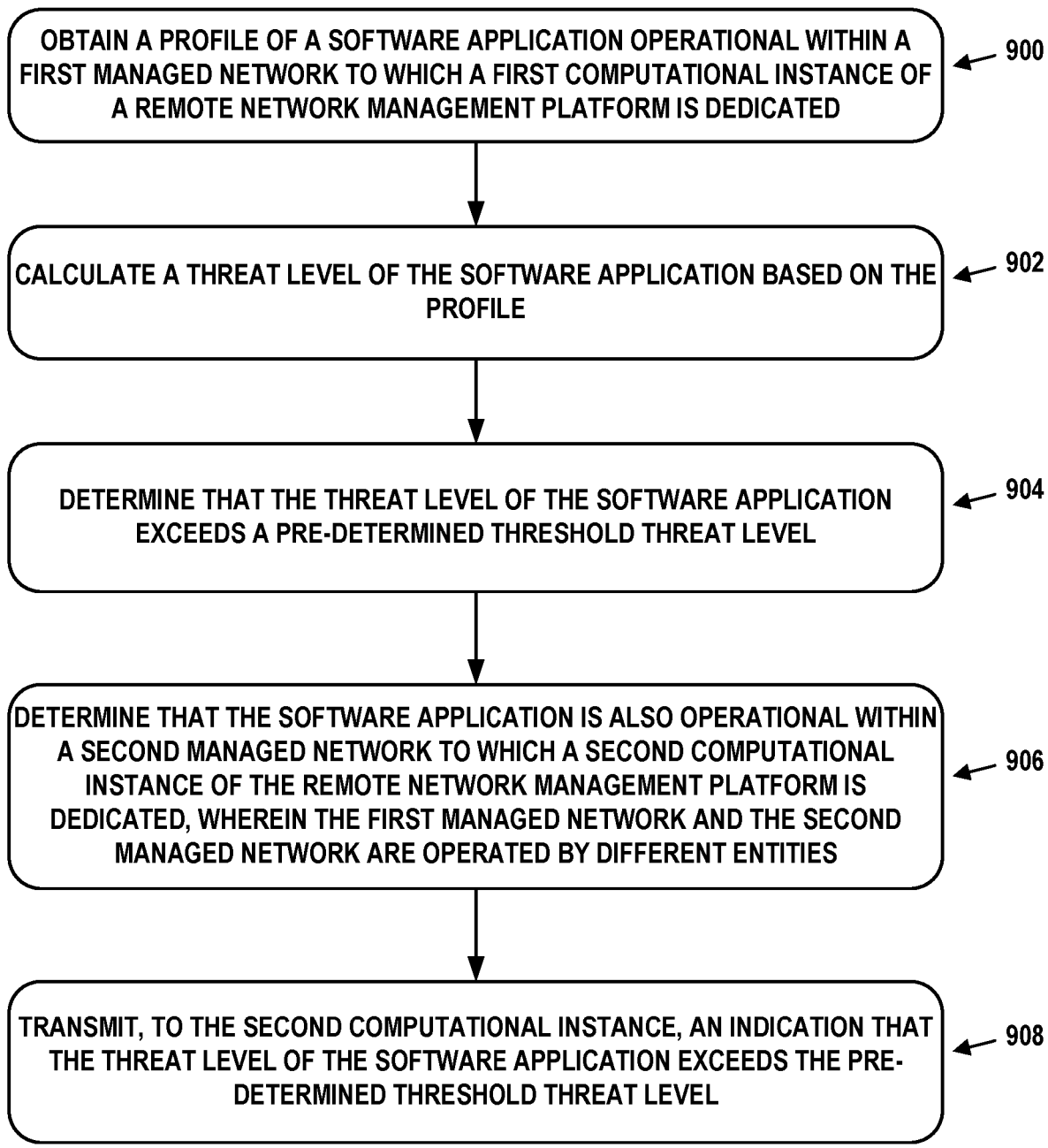
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining a profile of a software application operational within a first managed network to which a first computational instance of a remote network management platform is dedicated.

Block 902 may involve calculating a threat level of the software application based on the profile.

Block 904 may involve determining that the threat level of the software application exceeds a pre-determined threshold threat level.

Block 906 may involve determining that the software application is also operational within a second managed network to which a second computational instance of the remote network management platform is dedicated, where the first managed network and the second managed network are operated by different entities.

Block 908 may involve transmitting, to the second computational instance, an indication that the threat level of the software application exceeds the pre-determined threshold threat level.

In some embodiments the profile includes one or more of: a name of the software application, a name of a file used by the software application, a size of the file used by the software application, a checksum of the file used by the software application, a processor utilization attributed to the software application, or an amount of network traffic attributed to the software application.

Some embodiments may further involve anonymizing the profile by omitting or obscuring any information therein that is usable to identify the first managed network or the first computational instance, and transmitting, to a central instance of the remote network management platform, the profile as anonymized. The central instance might not be dedicated to any managed networks associated with computational instances of the remote network management platform.

In some embodiments, calculating the threat level of the software application involves looking up the software application in a database of software applications, and obtaining at least one factor influencing the threat level from the database of software applications.

Some embodiments may involve: (i) obtaining, from a third computational instance of the remote network management platform, an indication that the software application was classified as a threat by a third managed network to which the third computational instance is dedicated, and (ii) possibly based on the software application being classified as the threat by the third managed network, increasing the threat level of the software application.

Some embodiments may involve determining a number of computing devices, within the first managed network, on which the software application is operational. Calculating the threat level of the software application may be further based on the number of computing devices, within the first managed network, on which the software application is operational.

Some embodiments may further involve providing, for display on a graphical user interface of a client device, a color-coded heat map of a plurality software applications operational on computing devices disposed within the first managed network. For each of a plurality of computing devices disposed within the first managed network on which the software application is operational, the color-coded heat map may represent the software application with a first color representing that the software application exceeds the pre-determined threshold threat level.

A further software application operational within the first managed network might not exceed the pre-determined threshold threat level. The color-coded heat map may represent the further software application with a second color representing that the further software application does not exceed the pre-determined threshold threat level.

Some embodiments may further involve: (i) receiving, by way of the graphical user interface, a selection of the representation of the software application in the heat map, and (ii) possibly in response to receiving the selection, providing, for display on the graphical user interface, a textual description of one or more threats associated with the software application.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform comprising:
a plurality of computational instances dedicated to different managed networks, wherein each of the computational instances is configured to receive information regarding the operation of client computing devices of a respective managed network to which the computational instance is dedicated, and wherein each of the plurality of computational instances contains one or more respective computing devices; and
a central instance communicatively coupled to the plurality of computational instances, wherein the central instance is not dedicated to any of the managed networks, and wherein the central instance contains one or more central computing devices;
wherein a first computing device disposed within a first computational instance of the plurality of computational instances is configured to: obtain a profile of a software application operational on a first client computing device of a first managed network to which the first computational instance is dedicated, calculate a threat level of the software application based on the profile, determine that the threat level of the software application exceeds a pre-determined threshold threat level, and transmit, to the central instance, an indication that the threat level of the software application exceeds the pre-determined threshold threat level; and wherein a second computing device disposed within the central instance is configured to: receive the indication that the threat level of the software application exceeds the pre-determined threshold threat level, determine that the software application is also operational on a second client computing device of a second managed network to which a second computational instance of the plurality of computational instances is dedicated, and transmit, to the second computational instance, a further indication that the threat level of the software application exceeds the pre-determined threshold threat level, wherein the first managed network and the second managed network are operated by different clients of the remote network management platform.

2. The remote network management platform of claim 1, wherein the profile includes one or more of: a name of the software application, a name of a file used by the software application, a size of the file used by the software application, a checksum of the file used by the software application, a processor utilization attributed to the software application, or an amount of network traffic attributed to the software application.

3. The remote network management platform of claim 1, wherein the first computing device is further configured to:
anonymize the profile by omitting or obscuring any information therein that is usable to identify the first managed network or the first computational instance; and
transmit, to the central instance, the profile as anonymized.

4. The remote network management platform of claim 1, wherein calculating the threat level of the software application comprises:
looking up the software application in a database of software applications; and
obtaining at least one factor influencing the threat level from the database of software applications.

5. The remote network management platform of claim 1, wherein the second computing device is further configured to:
obtain, from a third computational instance of the plurality of computational instances, an indication that the software application was classified as a threat by a third managed network to which the third computational instance is dedicated; and
based on the software application being classified as the threat by the third managed network, increase the threat level of the software application.

6. The remote network management platform of claim 1, wherein the first computing device is further configured to:
determine a number of the client computing devices of the first managed network on which the software application is operational,
wherein calculating the threat level of the software application is further based on the number of the client computing devices of the first managed network on which the software application is operational.

7. The remote network management platform of claim 1, wherein the first computing device is further configured to:
provide, for display on a graphical user interface of a third client computing device of the first managed network, a color-coded heat map of a plurality software applications operational on the client computing devices of the first managed network,
wherein, for each of the client computing devices of the first managed network on which the software application is operational, the color-coded heat map represents the software application with a first color representing that the software application exceeds the pre-determined threshold threat level.

8. The remote network management platform of claim 7, wherein a further software application operational on the first client computing device of the first managed network does not exceed the pre-determined threshold threat level, and wherein the color-coded heat map represents the further software application with a second color representing that the further software application does not exceed the pre-determined threshold threat level.

9. The remote network management platform of claim 7, wherein the first computing device is further configured to:
receive, by way of the graphical user interface, a selection of the representation of the software application in the heat map; and
in response to receiving the selection, provide, for display on the graphical user interface, a textual description of one or more threats associated with the software application.

10. The remote network management platform of claim 1, wherein the threat level of the software application is specific to a particular industry, wherein the first managed network and the second managed network are associated with the particular industry, and wherein transmitting, to the second computational instance, the further indication that the threat level of the software application exceeds the pre-determined threshold threat level is based on the second managed network being associated with the particular industry.

11. A computer-implemented method of operating a remote network management platform, comprising:
hosting a plurality of computational instances of the remote network management platform, wherein each computational instance is configured to receive information regarding the operation of client computing devices of a respective managed network to which the computational instance is dedicated, and wherein each computational instance is communicatively coupled to a central instance of the remote network management platform;
obtaining, via a first computational instance, a profile of a software application operational on a first client computing device of a first managed network to which the first computational instance of the remote network management platform is dedicated;
calculating, via the first computational instance, a threat level of the software application based on the profile;
determining, via the first computational instance, that the threat level of the software application exceeds a pre-determined threshold threat level;
determining, via the central instance, that the software application is also operational on a second client computing device of a second managed network to which a second computational instance of the remote network management platform is dedicated, wherein the first managed network and the second managed network are operated by different clients of the remote network management platform; and
transmitting, from the central instance and to the second computational instance, an indication that the threat level of the software application exceeds the pre-determined threshold threat level.

12. The computer-implemented method of claim 11, wherein the profile includes one or more of: a name of the software application, a name of a file used by the software application, a size of the file used by the software application, a checksum of the file used by the software application, a processor utilization attributed to the software application, or an amount of network traffic attributed to the software application.

13. The computer-implemented method of claim 11, further comprising:
   anonymizing the profile by omitting or obscuring any information therein that is usable to identify the first managed network or the first computational instance; and
   transmitting, to the central instance, the profile as anonymized, wherein the central instance is not dedicated to any managed networks associated with the plurality of computational instances of the remote network management platform.

14. The computer-implemented method of claim 11, wherein calculating the threat level of the software application comprises:
   looking up the software application in a database of software applications; and
   obtaining at least one factor influencing the threat level from the database of software applications.

15. The computer-implemented method of claim 11, further comprising:
   obtaining, by the central instance and from a third computational instance of the remote network management platform, an indication that the software application was classified as a threat by a third managed network to which the third computational instance is dedicated; and
   based on the software application being classified as the threat by the third managed network, increasing, via the central instance, the threat level of the software application.

16. The computer-implemented method of claim 11, further comprising:
   determining a number of the client computing devices of the first managed network on which the software application is operational,
   wherein calculating the threat level of the software application is further based on the number of the client computing devices of the first managed network on which the software application is operational.

17. The computer-implemented method of claim 11, further comprising:
   providing, for display on a graphical user interface of a third client computing device of the first managed network, a color-coded heat map of a plurality software applications operational on the client computing devices of the first managed network,
   wherein, for each of the client computing devices of the first managed network on which the software application is operational, the color-coded heat map represents the software application with a first color representing that the software application exceeds the pre-determined threshold threat level.

18. The computer-implemented method of claim 17, wherein a further software application operational on the first client device of the first managed network does not exceed the pre-determined threshold threat level, and wherein the color-coded heat map represents the further software application with a second color representing that the further software application does not exceed the pre-determined threshold threat level.

19. The computer-implemented method of claim 17, further comprising:
   receiving, by way of the graphical user interface, a selection of the representation of the software application in the heat map; and
   in response to receiving the selection, providing, for display on the graphical user interface, a textual description of one or more threats associated with the software application.

20. An article of manufacture including a non-transitory computer-readable medium, having stored thereon program instructions that, upon execution by a remote network management platform, cause the remote network management platform to perform operations comprising:
   hosting a plurality of computational instances of the remote network management platform, wherein each computational instance is configured to receive information regarding the operation of client computing devices of a respective managed network to which the computational instance is dedicated, and wherein each computational instance is communicatively coupled to a central instance of the remote network management platform;
   obtaining, via a first computational instance, a profile of a software application operational on a first client computing device of a first managed network to which the first computational instance of a remote network management platform is dedicated;
   calculating, via the first computational instance, a threat level of the software application based on the profile;
   determining, via the first computational instance, that the threat level of the software application exceeds a pre-determined threshold threat level;
   determining, via the central instance, that the software application is also operational on a second client computing device of a second managed network to which a second computational instance of the remote network management platform is dedicated, wherein the first managed network and the second managed network are operated by different clients of the remote network management platform; and
   transmitting, from the central instance and to the second computational instance, an indication that the threat level of the software application exceeds the pre-determined threshold threat level.

* * * * *